(12) United States Patent
Maki et al.

(10) Patent No.: US 6,915,031 B2
(45) Date of Patent: Jul. 5, 2005

(54) SWITCH USING ELECTROOPTIC POLARIZATION SPLITTER AND COMBINER

(75) Inventors: Jeffery Maki, Fremont, CA (US); Paul Breaux, Volente, TX (US)

(73) Assignee: Finisar Corporation, Sunnyvale, CA (US)

( * ) Notice: Subject to any disclaimer, the term of this patent is extended or adjusted under 35 U.S.C. 154(b) by 57 days.

(21) Appl. No.: 10/278,568

(22) Filed: Oct. 22, 2002

(65) Prior Publication Data

US 2004/0076364 A1 Apr. 22, 2004

(51) Int. Cl.[7] .............................. G02B 6/35; G02B 6/27; G02B 6/34; G02B 27/10; G02B 27/28
(52) U.S. Cl. ............................... 385/16; 385/8; 385/11; 359/495
(58) Field of Search ........................... 385/1–11, 16–24; 359/495

(56) References Cited

U.S. PATENT DOCUMENTS

| | | | |
|---|---|---|---|
| 4,978,189 A | | 12/1990 | Blonder et al. |
| 5,056,883 A | | 10/1991 | Diemeer et al. |
| 5,317,658 A | * | 5/1994 | Bergland et al. ............... 385/16 |
| 5,757,993 A | * | 5/1998 | Abe .............................. 385/34 |
| 5,799,121 A | * | 8/1998 | Duck et al. ..................... 385/47 |
| 5,802,223 A | * | 9/1998 | Nashimoto ....................... 385/8 |
| 5,814,524 A | * | 9/1998 | Walt et al. ................... 436/518 |
| 5,920,662 A | * | 7/1999 | Hinkov .......................... 385/14 |
| 5,943,453 A | | 8/1999 | Hodgson |
| 6,128,422 A | | 10/2000 | Hodgson |
| 6,167,170 A | | 12/2000 | Boffi et al. |
| 6,169,626 B1 | | 1/2001 | Chen et al. |
| 6,175,668 B1 | | 1/2001 | Borrelli et al. |
| 6,324,312 B1 | | 11/2001 | Liao et al. |
| 6,540,411 B1 | * | 4/2003 | Cheng .......................... 385/79 |
| 6,563,973 B1 | * | 5/2003 | Caracci et al. ................ 385/17 |
| 6,609,841 B1 | * | 8/2003 | Wilde et al. ................. 398/159 |
| 6,823,097 B2 | * | 11/2004 | Glebov et al. ................ 385/16 |
| 2002/0031301 A1 | * | 3/2002 | Sasaki et al. ................. 385/34 |
| 2002/0131143 A1 | * | 9/2002 | He .............................. 359/246 |
| 2003/0059148 A1 | * | 3/2003 | Nishizawa et al. ............ 385/8 |
| 2003/0103718 A1 | * | 6/2003 | Chen ........................... 385/22 |

FOREIGN PATENT DOCUMENTS

GB          2207521 A   *  2/1989     .............. G02F/1/29

OTHER PUBLICATIONS

Chen et al., "Guided–Wave Electro–Optic Beam Deflector Using Domain Reveral in LiTaO3", Journal of Lightwave Technology, vol. 12, No. 8, Aug. 1994, pp. 1401–1404.*

* cited by examiner

*Primary Examiner*—Michelle R. Connelly-Cushwa
(74) *Attorney, Agent, or Firm*—Workman Nydegger

(57) ABSTRACT

An optical switch includes a polarization splitter/combiner that is made of a material that changes its refractive index in response to voltage. The polarization splitter divides an input beam into a first polarized component and a second polarized component. Each of the first and second polarized components is fed into a first polarization-sensitive deflector and a second polarization-sensitive deflector, each of which deflects a light beam by a predetermined angle. A plurality of polarization combining systems are positioned to receive a deflected first component and a deflected second component and combine the first and the second deflected components into an output beam propagating through an output fiber.

9 Claims, 10 Drawing Sheets

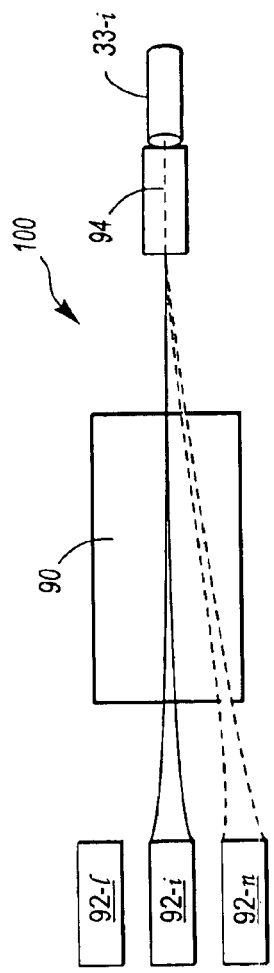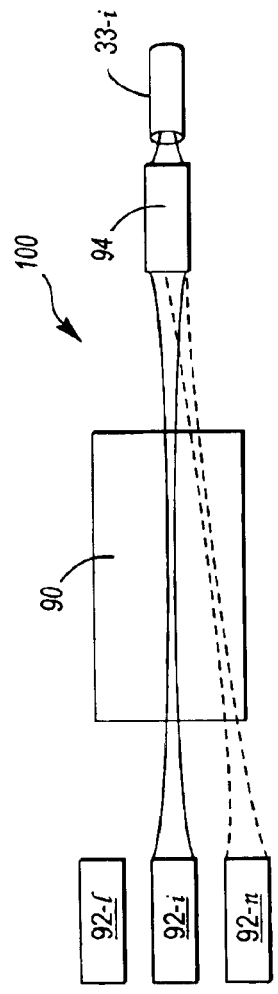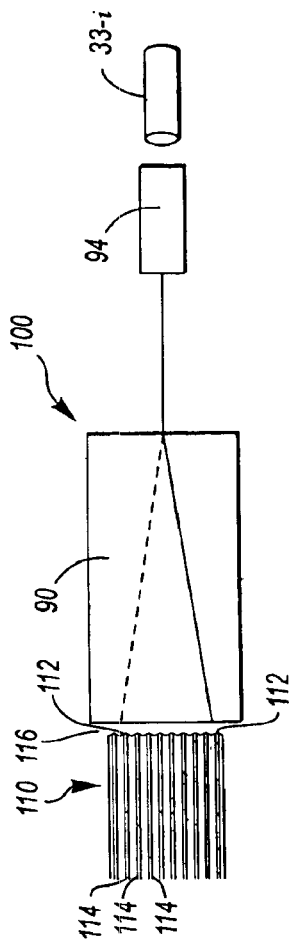
Fig. 5A
Fig. 5B
Fig. 6

SWITCH USING ELECTROOPTIC POLARIZATION SPLITTER AND COMBINER

BACKGROUND OF THE INVENTION

This invention relates generally to optical devices and particularly to optical switching systems.

The increasing demand for high-speed broadband communications has resulted in a rapid increase in fiber optic communications systems which require faster and more reliable components to interconnect associated optoelectronic devices of a network. These components may include devices for steering light beams through light transmissive mediums at specific angles. Currently, devices use opto-mechanical or electro-optical technology to steer light beams to a specified angle.

Opto-mechanical technology for signal channeling or steering have several disadvantages. For example, opto-mechanical devices are bulky and slow due to the mechanical scanning devices employed for optical signal distribution. In addition, degradation of mechanical components often makes these devices less reliable. Opto-mechanical devices also require complicated three-dimensional angular alignment, resulting in a low tolerance to harsh environments. Furthermore, due to optical mode mismatching, opto-mechanical devices often fail to provide low-loss coupling among devices such as laser diodes, optical modulators, waveguide splitters, single-mode optic fibers, multi-mode optic fibers, and optical detectors.

Other conventional deflection devices, such as devices including lithium niobate, are generally faster since they do not involve moving parts. Lithium niobate devices can operate even faster (e.g., switching speed in the order of microseconds) than the thermo-optic devices (e.g., switching speed in the order of milliseconds), which are generally faster devices than the opto-mechanical devices. In addition to faster speed, the absence of moving parts in lithium niobate devices results in the lithium niobate devices being more reliable. These lithium niobate devices, however, have not been incorporated into switching systems because of their polarization dependence. The lithium niobate devices deflect light beams differently depending on their polarization states, and the polarization states of the light beams in a switching system are not always consistent.

Other types of electro-optical devices that are not polarization sensitive are available. However, these electro-optical devices are also generally incompatible with the ever shrinking electronic components fabricated today. Without the ability to integrate the optical switching technology into smaller devices, laser technology may become obsolete for many current needs.

What is needed is a polarization-insensitive optical switching device that is fast enough and can be integrated into smaller devices.

SUMMARY OF THE INVENTION

An optical switch includes a polarization splitter/combiner that is made of a material that changes its refractive index in response to voltage. The polarization splitter divides an input beam into a first polarized component and a second polarized component. Each of the first and second polarized components is fed into a first polarization-sensitive deflector and a second polarization-sensitive deflector, each of which deflects a light beam by a predetermined angle. A plurality of polarization combining systems are positioned to receive a deflected first component and a deflected second component and combine the first and the second deflected components into an output beam propagating through an output fiber.

BRIEF DESCRIPTION OF THE DRAWINGS

FIG. 5A depicts an asymmetrically arranged polarization combining system that includes the polarization combiner of FIG. 3;

FIG. 5B depicts a symmetrically arranged polarization combining system that includes the polarization combiner of FIG. 3;

FIG. 6 depicts a polarization combining system including a microlens array;

DETAILED DESCRIPTION OF THE INVENTION

The invention is particularly directed to an electrooptic switch, such as an electrooptic switch made with lithium niobate (LNO) or lithium tantalate. It will be appreciated, however, that this is illustrative of only one utility of the invention, which is not limited to the embodiments and uses described herein.

As used herein, directional terms such as "upward," "downward," and "upside-down" are used with respect to each figure being described. Thus, "upward" is toward the top of the relevant figure and "downward" is toward the bottom of the relevant figure.

Figure 1:
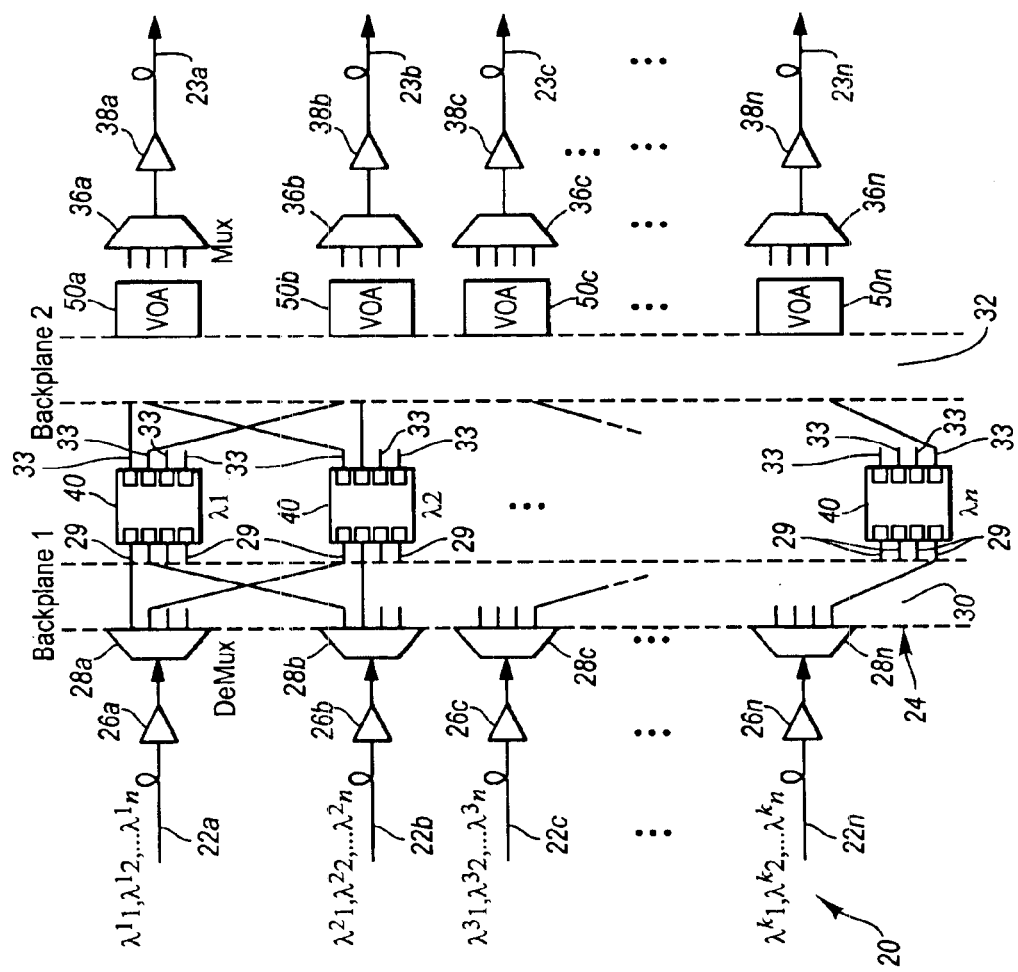
FIG. 1 depicts a communication system in which the polarization splitter/combiner of the invention may be implemented.

FIG. 1 depicts a communication system 20 in which the polarization splitter/combiner of the invention may be implemented. The communication system 20 includes first fiber optic cables 22a–22n, second fiber optic cables 23a–23n, and a switching center 24 located between the first fiber optics cables and the second fiber optic cables. Wavelength division multiplexing (WDM) techniques may be used to allow each fiber optic cable 22 and 23 to carry multiple optical signals at various wavelengths which substantially increases the efficiency of each fiber optic cable 22 and 23. The switching center 24 includes multiple optical switches 40 formed in accordance with teachings of the present invention. Optical switches 40 cooperate with each other to allow switching of a selected optical signal from one of the first fiber optic cables 22a–22n to a selected one of the second fiber optic cables 23a–23n.

Various features of the invention will be described with respect to switching of an optical signal as it travels from a first fiber optic cable 22 to a second fiber optic cable 23. An optical switch formed in accordance with the invention may be satisfactorily used to switch optical signals traveling in either direction through a fiber optic cable network or through associated waveguides.

Each of the first fiber optic cables 22a–22n is preferably coupled with switching center 24 through a respective amplifier 26 and a dense wavelength division (DWD) demultiplexer 28. The output from a DWD demultiplexer is fed into an optical switch 40 through one of first optical fibers 29. As the optical switch 40 is not a wavelength-splitter, a particular wavelength output from the demultiplexer 28 is fed into one optical switch 40, effectively making each optical switch 40 receive one wavelength. Backplane 30 is preferably provided for use in optically coupling each DWD demultiplexer 28 with optical switches 40. Likewise, a second backplane 32 is preferably provided to couple the output from optical switches 40 with variable optical attenuators 34. A light beam exiting optical switch 40 reaches one of the variable optical attenuators 34 via one of second optical fibers 33. The variable optical attenuators 34 are provided to adjust the power level of all signals exiting from backplane 32 to within a desired range. These variable optical attenuators 34 are necessary because the power level of each signal transmitted from a respective first fiber optic cable 22 to a respective fiber optic cable 23 may vary significantly.

The variable optical attenuators 34 are coupled with a plurality of DWD multiplexers 36. The power level for each signal communicated through second backplane 32 is preferably adjusted to avoid communication problems associated with multiple signals at different wavelengths and different power levels. Thus, the signals communicated from each DWD multiplexer 36 are preferably directed through a respective amplifier 38 before being transmitted to the associated one of the second fiber optic cables 23.

Figure 2:
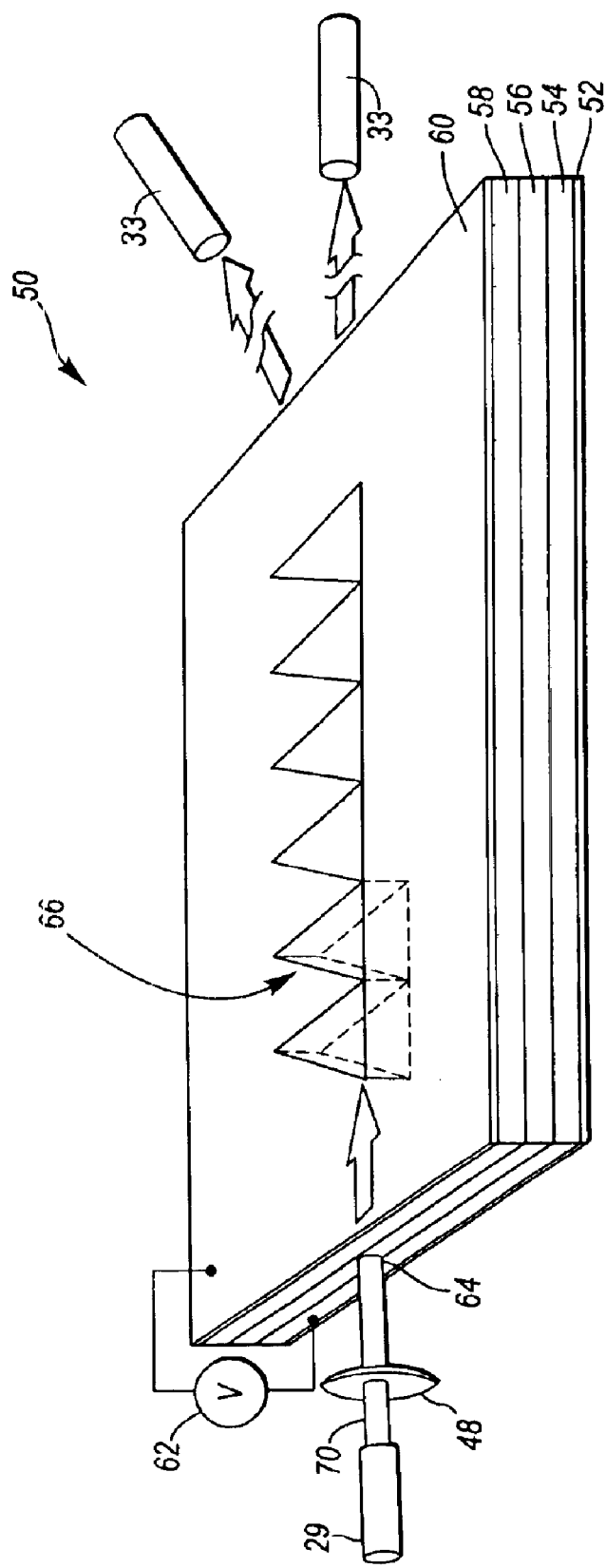
FIG. 2 depicts a lithium niobate device with prisms that may be used to implement various optical devices.

FIG. 2 depicts a lithium niobate device 50 that may be used to implement various optical devices, e.g., a switch. An input lens 48 is located between an optical fiber 29 and the lithium niobate device 50. The lithium niobate device 50 includes a lower electrode 52, a lower buffer layer 54, a core layer 56, an upper buffer layer 58, and an upper electrode 60. The lower electrode 52 and the upper electrode 60, which are typically made of an electrically conductive material, may cover the entire bottom and top surfaces of lithium niobate device 50 but is not limited to being any size or shape. The lower electrode 52 and the upper electrode 60 are coupled to a voltage source 62. The buffer layers 54 and 58 may each be a transparent dielectric layer having a refractive index less than that of the core layer 56. The buffer layers 54 and 58 typically include silicon dioxide doped with $In_2O_3$ and/or $TiO_2$. The core layer 56, which is also referred to as the "LNO slab," includes an input waveguide 64, a prism array 66, and a plurality of output waveguides (not shown in this figure). The prism array 66 includes a poled region in the LNO core layer that deflects an incident light beam when an electrical bias is applied through electrodes 52 and 60.

A light beam 70 propagates in optical fiber 29 and reaches input lens 48. The light beam is preferably linearly polarized since the lithium niobate device 50 is polarization-sensitive. The input lens 48 focuses the light beam into the input waveguide 64 so that the input light beam 70 propagates into the LNO slab 56 and reaches the prism array 66. The light beam may be deflected by the prism array 66 if the beam has the proper polarization state and the electrical bias applied through the electrodes 52 and 60 causes deflection. A desired amount of deflection is achieved by controlling the polarization state of the input light beam 70 and the voltage at the voltage source 62. Unlike a conventional deflector which has predetermined angles of deflection that an input light beam can experience, the lithium niobate device 50 allows the angle of deflection to be manipulated substantially continuously within a range through the applied voltage. Thus, although only discrete levels of deflection are necessary to direct the light beam into one of a fixed set of output fibers 33 (FIG. 1), the continuously-tunable lithium niobate device 50 provides extra flexibility to the positioning of output fibers 33. The light beam may travel through LNO slab 56 without being deflected. Although not shown, the deflected (or undeflected) light beam may be focused into an output optical fiber 33 by an output lens after exiting the prism array 66.

The LNO slab 56 may be designed to be as thick as possible without allowing the beam to diverge excessively. The LNO slab 56 may be, for example, approximately 100–300 $\mu$m thick. Reducing the thickness of the LNO slab 56 results in reduction of the amount of voltage that is needed to control the deflection angle of the beam. Therefore, using a thin LNO core creates a more energy-efficient deflector. The LNO slab may be 3–10 mm long. Preferably, the LNO core is sized so that a voltage of 100–300 Volts creates two resolvable spots.

The prism array 66 is not limited to any number of prisms, but may include any number of prisms necessary to achieve the desired deflector linearity with applied voltage. As the light beam is deflected by each prism in the prism array 66, a large overall angle of deflection is achieved by making the light pass through multiple prisms. The prisms in prism array 66 are preferably triangular-shaped. In some embodiments, all the prisms in prism array 16 may be identical. In other embodiments, the prisms may vary in size, for example by getting progressively larger in the direction of beam propagation. The prisms of the prism array 66 do not have to be lined up as shown in the Figures. A prism may be, for example, 0.1–1.2 mm in height. One way of determining the prism height is to maximize the number of resolvable spots (N) based on the following formula:

$$N = n_o r_{33} V L \pi \omega_o / 2dh\lambda,$$

wherein n = index of refraction along the ordinary axis in the LNO layer, which is typically around 2.214;

$r_{33}$ = electro-optic coefficient in picometers/volt, which is typically around 31 pm/V for a beam having $n = n_o$;

V = applied voltage;

L = length of LNO slab;

$\omega_0$ = minimum beam waist;

d = thickness of LNO slab;

h = prism height; and $\lambda$ = beam wavelength, which may be 1.55 $\mu$m.

More details about the lithium niobate device 50 may be found in co-pending patent application Ser. No. 10/278.209.

The prism array 66 may be formed by applying an electric field poling method to the LNO core layer. Electric field poling aligns the dipole moments of the atoms in the LNO slab 56. Preferably, domain inversion is achieved by poling a triangular prism region in one direction and poling the region outside the triangular prism region in an opposite direction. Domain inversion is a well-known standard technique for increasing the effectiveness of poling.

It is essential to know the right poling parameters such as poling temperature and maximum achievable electric field in order to avoid a breakdown of prism array 66. In a sandwich structure such as the one shown in FIG. 1, the electric and dielectric properties of the different layers as well as the choice of the conductive material used for the electrodes will determine the electrical poling field strength inside the active layer and the magnitude of the current flowing through the sandwich structure. A person of ordinary skill in the art would understand that it is important to (1) maximize the effective poling field inside the LNO-layer in order to obtain a high degree of noncentrosymmetrical order and, hence, a high EO-coefficient and (2) minimize the current flow through the sandwich in order to avoid dielectric (avalanche) breakdown at higher fields.

Once light beam 170 enters lithium niobate device 50 through the input waveguide 64, the applied electrical bias are used to manipulate the deflection angle of the input light beam 170 (e.g., a laser beam). The angle of deflection may be controlled by the amount of voltage applied to electrodes 52 and 60. For example, in one embodiment, applying a high voltage may result in a large overall angle of deflection while applying a weak voltage may result in a small overall angle of deflection. Applying a positive voltage may result in deflection in one direction and applying a negative voltage may result in deflection in another direction. Applying a constant voltage, the angle of deflection can be selected by changing the polarization states of the light beam between TE and TM since light beams of these different polarization states experience different indices of refraction while propagating through the lithium niobate device 50. Preferably, the input beam has a known polarization state. The prism array 66 deflects the input beam into different directions depending on the polarization state of the beam. By being deflected by a specific angle, the light beam is directed into a desired one of the plurality of output optical fibers 33. The output optical fibers 33, which may be single mode optical fibers, may be placed near lithium niobate device 50 or incorporated into lithium niobate device 50 in a manner similar to the input waveguide 29. The output optical fibers 33 may be pigtailed to the lithium niobate device 50.

In an alternative embodiment of lithium niobate device 50, the entire LNO slab is poled instead of just a triangular-shaped region. Deflective prisms are formed by using electrodes that are triangular-shaped. When voltage is applied through the triangular-shaped electrodes, triangular-shaped prisms made of a poled region forms in the slab.

Figure 3:
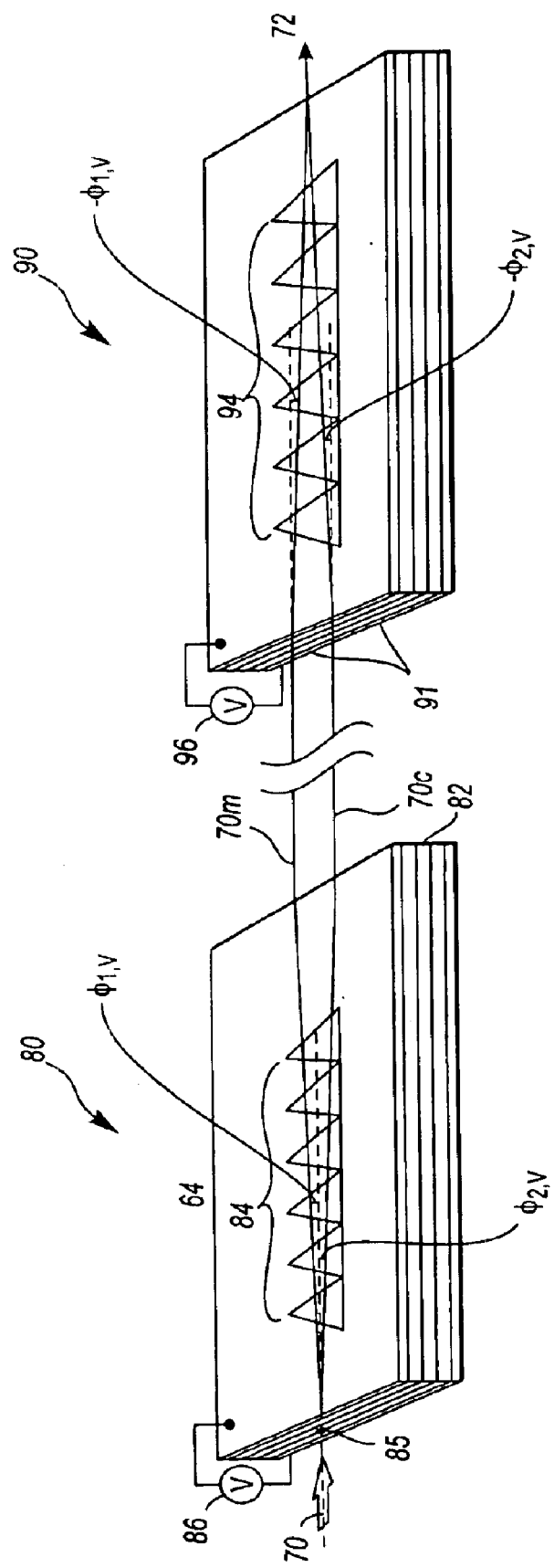
FIG. 3 illustrates how the lithium niobate device of FIG. 2 is used to split and combine light beams based on polarization states.

FIG. 3 illustrates how the LNO device of FIG. 2 is used as a polarization splitter 80 and a polarization combiner 90. An unpolarized input light beam 70 enters a first LNO slab 82 and propagates across a prism array 84. A voltage 86 ($V_{86}$) is applied to control the angle of deflection, and the polarization state determines the angle of deflection. Thus, when the input light beam 70 strikes the first prism in prism array 84, the input light beam having a certain polarization state (e.g., TM polarization state) is deflected by an angle $\phi_{1, V}$ to become a deflected beam 70m, wherein $\phi_{1, V}$ is measured from the direction in which the input light beam 70 was propagating prior to being deflected. The "V" in the subscript indicates the magnitude of the applied voltage. When the deflected beam 70m enters the polarization combiner 90, it passes through the prisms 94. A voltage 96 ($V_{96}$) which is of opposite polarity to the voltage 86 that was applied to the polarization splitter ($V_{96}=-V_{86}$), is applied to the polarization combiner 90. The reverse voltage causes the deflected beam 70m to deflect at an angle $-\phi_{1, V}$.

While the portion of the input beam 70 having a certain polarization state (e.g., TM) is deflected by an angle $\phi_{1, V}$ in the polarization splitter 80, the portion of the input beam 70 having another polarization state (e.g., TE) is deflected by an angle $\phi_{2, V}$ to form a deflected beam 70e. When the deflected beam 70e enters the polarization combiner 90 and experiences the voltage 96, the deflected beam 70e deflects at an angle $-\phi_{2, V}$. Since the deflected beam 70m was first deflected by $\phi_{1, V}$ and then by $-\phi_{1, V}$ and the deflected beam 70e was first deflected by $\phi_{2, V}$ and then by $-\phi_{2, V}$, the two deflected beams 70m and 70e are substantially back to their original direction of propagation after being deflected twice. More importantly, the two deflected beams 70m and 70e are back to traveling in the same direction as an output beam 72 when they exit the polarization combiner 90. The direction in which the output beam 72 propagates is manipulated by the applied voltages 86 and 96. Generally, two components of the input beam 70 are deflected away from each other in the polarization splitter 80 and toward each other in the polarization combiner 90.

Although the output beam 72 propagates in substantially the same direction as the input beam 70 in this simplified example, the output beam 72 can be made to travel in any direction by manipulating various optical components between the polarization splitter 80 and the polarization combiner 90, and by applying voltages of different magnitudes to the polarization splitter 80 and the polarization combiner 90. Also, this invention is not limited to the polarization splitter 80 and the polarization splitter 90 being substantially the same except for the applied voltages. Although the splitter 80 and the combiner 90 being substantially the same is favorable from a manufacturing standpoint, the prism array 84 can be made to be different from the prism array 94, and the splitter 80 can have different dimensions than the combiner 90. Although not clearly shown, the deflected beams 70m and 70e bend each time they pass through a prism in the prism arrays 84, 94. Thus, the overall degree of deflection for each light beam depends partly on the number of prisms it propagates through and the amount of deflection that is achieved with each prism.

Light beams 70m and 70e enter the polarization combiner 90 through an entrance surface of the polarization combiner 90. The entrance surface includes a plurality of waveguides 91, and depending on the angle of deflection achieved by polarization splitter 80, one of the deflected light beams 70m or 70e couples into one of waveguides 91 that are integrated into the polarization combiner 90. Although not shown, various optical elements, such as a lens, may be present between the polarization splitter 80 and the polarization combiner 90 to properly focus one of the deflected light beams 70m and 70e into one of the waveguides 91 with minimum coupling loss. These various optical elements, at least some of which may be integrated into the optical splitter 80 or the optical deflector 90, may also orient the light beams so that they enter the waveguide from a proper angle. Similarly, there may be various optical elements receiving the light beams exiting the polarization combiner 90 and coupling them into optical fibers.

Figure 4:
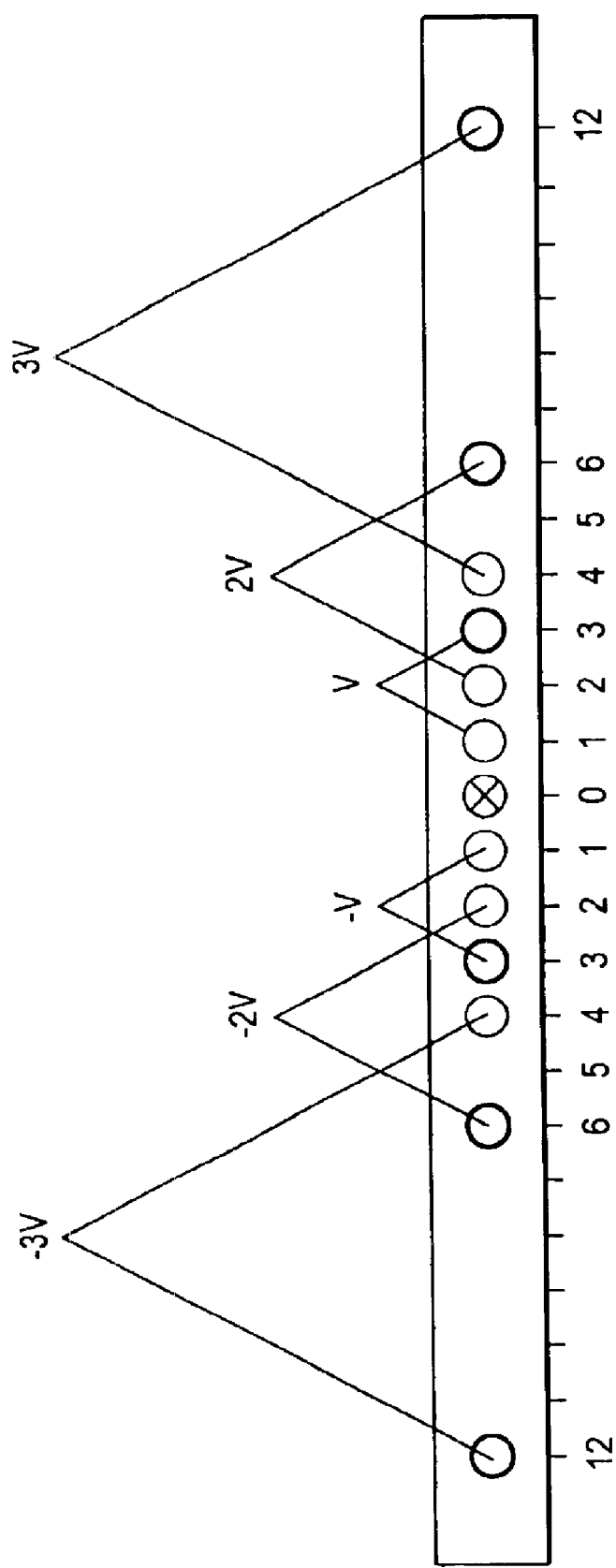
FIG. 4 is a cross sectional view of a set of polarization-split light beams as seen from the exit surfaces of the polarization splitter in FIG. 3.

FIG. 4 is a cross sectional view of a set of polarization-split light beams as seen from the exit surfaces of the polarization splitter 80 in FIG. 3. In this example, $\phi_1$ is assumed to be three times as large as $\phi_2$ ($\phi_1=3\phi_2$), the deflected beam 70m is TM-polarized, and the deflected beam 70e is TE-polarized. Thus, the TM-polarized beam is deflected by an angle three times as larges as the angle at which the TE-polarized beam is deflected. The dark spots indicate where a TM-polarized beam would hit and the light spots indicate where a TE-polarized beam would hit. When no voltage is applied, the angle of deflection is very small, substantially zero, resulting in the spot near the center that is marked with an X. When a voltage of −V is applied, the TE-mode beam is deflected by $\phi_{2,V}$ and the TM-mode beam is deflected by $-3\phi_{2,V}$, resulting in spots indicated by the notation −V. When a voltage of −2V is applied, the TE-mode beam is deflected by $-\phi_{2,2V}$ which is a larger angle than $-\phi_{2,V}$ and the TM-mode is deflected by $-3\phi_{2,2V}$. When the voltage is increased even more to −3V, the angle of deflections further increase so that the TE-mode beam is deflected by $-\phi_{2,3V}$ and the TM-mode beam is deflected by $-3\phi_{2,3V}$. When the polarity of the applied voltage is changed, the light beams deflect the same amount but in an opposite direction. Thus, at a voltage of V, the TE-mode beam is deflected by $\phi_{2,V}$ and the TM-mode is deflected by $3\phi_{2,V}$. At a voltage of 2V, the TE-mode beam is deflected by $\phi_{2,2V}$ and the TM-mode is deflected by $3\phi_{2,2V}$. The scale in the figure indicates that $\phi_{2,2V}$ is approximately twice as large as $\phi_{2,V}$. When the applied voltage is further increased to 3V, the TE-mode is deflected by $\phi_{2,3V}$ and the TM-mode is deflected by $3\phi_{2,3V}$. Regardless of the magnitude or the sign of the voltage that is applied, the TM-mode is deflected by approximately three times as large of an angle as the TE-mode. The spots are well separated only if the difference in the deflection angles for TE and TM light exceeds the diffraction cone angle of the light beams by a minimum amount. As the magnitude of the applied voltage is increased, the separation between the TE-mode and the TM-mode becomes larger, leading to fewer resolvable spots. Thus, by controlling the applied voltage, the number of resolvable spots and degree of separation between each deflected beam can be manipulated.

FIG. 5A and FIG. 5B depict a polarization combining system 100, which includes a plurality of combiner input lens 92-1 through 92-n, a polarization combiner 90, and a combiner output lens 94 that are optically coupled to an output optical fibers 33-i of optical fibers 33-1 through 33-n. Preferably, the combiner input lens lenses 92-1 through 92-n and the combiner output lens 94 are Gradient Index (GRIN) lenses. Each of the output optical fibers 33-1 through 33-n may be a thermally enlarged core (TEC) fiber. Preferably, the TEC fiber is chosen so that it has a numerical aperture that matches the diameter of the beam coming out of lens 94 so that coupling loss is minimized.

FIG. 5A depicts the polarization combining system 100 arranged asymmetrically. In this asymmetric arrangement, the combiner input lens 92-i, which is one of the combiner input lenses 92-1 through 92-n, is selected and positioned so that its focal plane is located beyond the polarization combiner 90. For example, the focal plane of the combiner input lens 92 may be located near the combiner output lens 94. Focusing the light beam on the combiner output lens 94 results in the light beam traveling only a short distance between the focal plane and the output fiber 33-i. Due to this short travel distance, the light beam does not diverge too much before reaching the output fiber 96. Therefore, coupling loss is minimized.

FIG. 5B depicts the polarization combining system 100 arranged symmetrically. The combiner input lens 92-i is arranged so that the deflected light beam is focused near the center of the optical combiner 90. In setting up the symmetric arrangement, the combiner output lens 94 is positioned so that it captures most of the light beam coming out of the optical combiner 90 before the light beam diverges too much. If the combiner input lens 92-i is substantially similar to the combiner output lens 94, the focal planes of both lenses 92-i, 94 should coincide near the center of the optical combiner 90. The advantage of the symmetric arrangement (FIG. 5B) over the asymmetric arrangement (FIG. 5A) is that only the symmetric arrangement allows bi-directional operation, since light beam can travel in either direction and be affected in substantially the same way. However, the symmetric arrangement is more difficult to optimize than the asymmetric arrangement, which is designed to perform a specific function to a light beam traveling in one predetermined direction.

In an exemplary symmetric embodiment, the length of the input lens 92 in the direction of beam propagation is 2.845 mm, and the length of the LNO slab in the combiner 90 is 3.2 mm. The distance between the exit surface of the GRIN lens 92-i, which is the surface that is closest to the LNO slab, and the focal point is about 4.86 mm in this embodiment. The focal point 82 is designed to be approximately near the middle of the LNO slab 56. After the focal point, the light beam begins to diverge and becomes larger. Since the beam diameter is preferably smaller than the thickness of LNO slab throughout the length of the LNO slab, the beam diameter near a surface 84 and the exit surface 86 are about 100 μm. The radius of the light beam near the focal point, or the radius of the light beam where the light beam is the thinnest, is referred to as the "beam waist."

FIG. 6 depicts an embodiment of the polarization combining system 100 including a microlens array 110 integrated with the optical combiner 90. The microlens array 110 includes an array of microlenses 112 spaced close together (100–250 μm apart), wherein each microlens is coupled to one of input fibers 114. An input fiber 114 may be positioned in a V-groove, which is a well known way of positioning optical fiber. The gap 116 between the optical combiner 90 and the microlens array 110 may be filled with an index-matching epoxy to increase coupling efficiency. Discrete voltage levels may be applied to the optical combiner 90 so that a light beam 118 entering the optical combiner 90 can be directed into a desired one of the output fibers 33-1 through 33-n.

Figure 7:
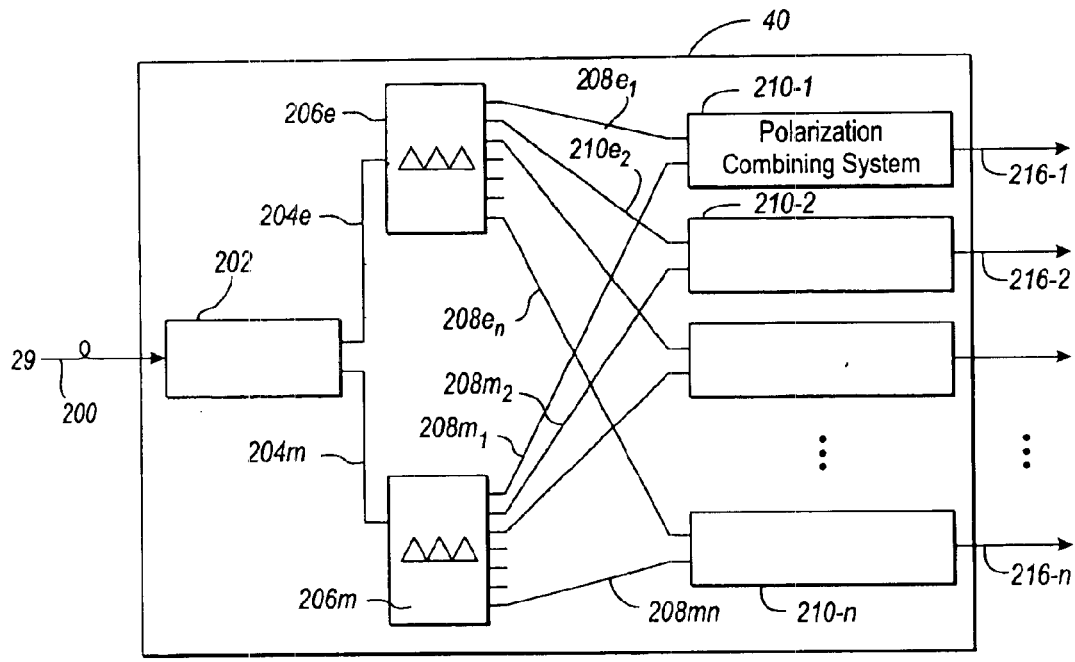
FIG. 7 depicts a 1×n switch using a polarization splitter and combiner in accordance with the invention.

FIG. 7 depicts a 1×n switch 40 using a polarization splitter and combiner in accordance with the invention. In the particular example, n=7, as indicated by seven possible directions in which a light beam can be deflected by each of deflectors 206e and 206m. The switch 40 may be a part of the switch 40 shown in FIG. 1. An unpolarized light beam 200 enters the switch 40 and first passes through a polarization splitter 202. The polarization splitter may be any of the conventional polarization splitters available in the market or a lithium niobate polarization splitter such as the polarization splitter 80 shown in FIG. 3. The polarization splitter 202 divides the light beam 200 into a TE component 204e and a TM component 204m.

The TE component 204e is fed into a deflector 206e, which may be a polarization-sensitive lithium niobate deflector of the sort shown in FIG. 2. Depending on the voltage that is applied to the deflector 204e, the deflected TE component $208e_x$, which is an output beam traveling in the direction of one of the deflected TE component $208e_1$ through 208$e_n$, propagates in different directions, as shown in FIG. 4. Each deflected TE component 208$e_x$ is received by one polarization combiner 210-i selected from polarization combiners 210-1 through 210-n.

The TM component 204$m$ is fed into a deflector 206$m$, which may be a polarization-sensitive lithium niobate deflector of the sort shown in FIG. 2. For ease of manufacturing, the deflector 206$m$ may be the same as the component as the deflector 206$e$. In this case, the polarization state of the light beam 204$m$ needs to be rotated so that the deflector 206$m$, which is designed for the TE polarization state, achieves the desired result in terms of deflecting the light beam 204$m$. Exiting from the deflector 206$m$ is a deflected light beam 208$m_y$, which is one of the deflected TM components 208$m_1$ through 208$m_n$ propagating in different directions. Each deflected TM component 208$m_y$ is received by one of the polarization combiners 210-1 through 210-n. The angle of deflection by the deflector 206$e$ and the deflector 206$m$ are coordinated so that one of the deflected TE components 208$e_1$ through 208$e_n$ combines with a predetermined one of the deflected TM components 208$m_1$ through 208$m_1$. For example, the deflected TE component 208$e_1$ and the deflected TM component 208$m_1$ may both be directed into polarization combiner 210-1 where they combine to become output beam 216-1. Similarly, the deflected beam 208$e_2$ and the deflected beam 208$e_2$ may both be directed into polarization combiner 210-2 to become output beam 216-2. Each of the polarization combiners 210-1 through 210-n may be one of the polarization combining systems shown in FIGS. 5A, 5B, and 6. Thus, an output beam is coupled into one of n output fibers and exit the switch 40.

If the polarization splitter 202 and the polarization combiners 210-1 through 210-n are lithium niobate components such as polarization splitter 80 and polarization combiner 90 of FIG. 3, polarization combiners 210-1 through 210-n may be substantially identical to the polarization splitter 202 except for the polarity of the applied voltage. In order to make the beams deflect in opposite directions, the voltage applied to the polarization combiner would be opposite the voltage applied to the polarization splitter 202 when two identical LNO slabs are used. Alternatively, the polarization splitter and the polarization combiners may be designed so that they deflect a light beam in opposite angles (i.e., $\phi$ instead of $-\phi$) in response to the same voltage. For example, the prism array in one LNO slab may be positioned upside down relative to the prism array in the other LNO slab.

In an integrated 1×n switch 40, the LNO-with-prism type polarization splitter/combiner of FIG. 3 is used to build an overall optical assembly. Although the LNO-type polarization splitter/combiner differs from the conventional polarization splitter/combiner in that it is not passive (i.e., it requires a voltage source), providing a voltage source is not an additional requirement in a switch context where a voltage source is provided to drive the prism switching function.

Figure 8:
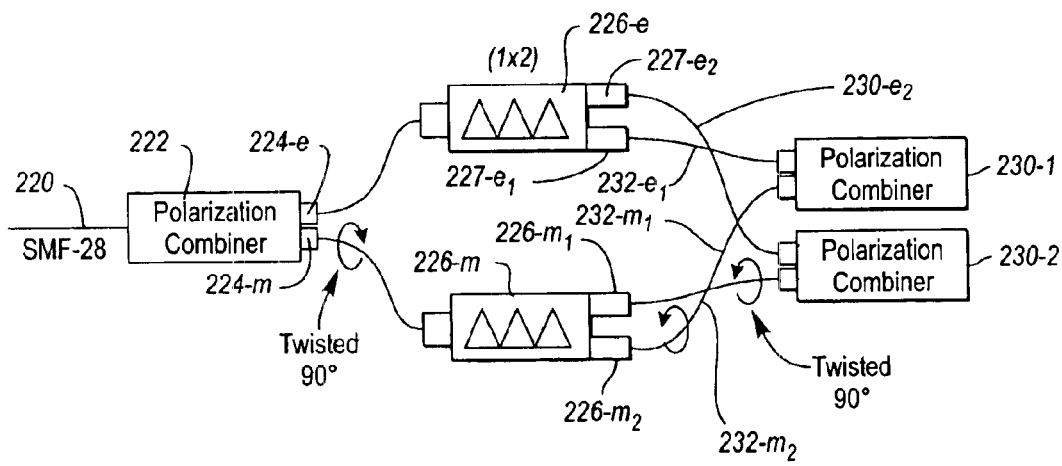
FIG. 8 depicts a 1×2 switch in accordance with the invention.

FIG. 8 depicts a 1×2 switch in accordance with the invention, and shows more details than the 1×n switch of FIG. 7. An unpolarized input light beam 220 propagates in an optical fiber 29 (see FIG. 1), which may be a single mode fiber (e.g., SMF-28). The input light beam 220 enters a polarization splitter 222, which splits the input light beam 220 into a TE component 224$e$ and a TM component 224$m$. The TE component 224$e$ and the TM component 224$m$ are fed into a deflector 226$e$ and a deflector 226$m$, respectively. In this example, the deflectors 226$e$ and 226$m$ are 1×2 deflectors since the switch is a 1×2 switch. After passing through the TE deflector 226$e$, a deflected beam 232$e_2$ that is deflected by a large angle is coupled into a polarization combiner 230-2. On the other hand, if the light beam is deflected by a small angle, the deflected light beam 232$e_1$ is coupled into a polarization combiner 230-1. Similarly, a light beam that passes through the TM deflector 226$m$ may be deflected by a large angle so that the deflected beam 232$m_1$ is coupled into the polarization combiner 230-1 or by a small angle so that the deflected beam 232$m_2$ is coupled into the polarization combiner 230-2. The polarization combiners 230-1 and 230-2 may be lithium niobate-type polarization combiners such as the polarization combiner 90 shown in FIG. 3, or any other conventional polarization combiner that a person of ordinary skill in the art deems suitable.

The TE component 224$e$ and the TM-polarized beam 224$m$ travel through polarization maintaining fiber (PMF) between the polarization splitter 222 and the deflectors 226$e$ and 226$m$, and between the deflectors 226$e$, 226$m$ and the polarization combiners 230-1, 230-2 so that each light beam maintains its polarization state. If the polarization states are altered while traveling between the polarization splitter 222 and the deflectors 226$e$ and 226$m$, the deflection will not occur properly because the deflectors 226$e$ and 226$m$ are polarization sensitive. Similarly, since the polarization combiners 230-1, 230-2 combine light beams of orthogonal polarization states (e.g., TE and TM), the polarization states of the beams entering the polarization combiners need to be maintained. There may be additional optical devices to the switch shown in FIG. 7. For example, if the deflectors 226$e$ and 226$m$ are substantially identical, the TM component 224$m$ would have to be rotated 90° in order for the deflector 226$m$ to direct the light beam properly into one of the two deflected beams 232$m_1$ and 232$m_2$. Since the polarization combiner is polarization sensitive, however, the polarization state of the deflected beams 232$m_1$ and 232$m_2$ have to be rotated back to the TM mode before one of the deflected beams enter the polarization combiner. Thus, the TM-polarized beam 224$m$ may actually pass through the deflector 226$m$ as a TE-polarized light beam, but then be converted back into TM-mode before being combined with the TE counterpart in a polarization combiner. This conversion of the TM-polarized beam 224$m$ into TM polarized beam is desirable for avoiding optical interference of the two polarization states when the TM-polarized beam 224$m$ is eventually combined with the TE-polarized beam 224$e$.

Figure 9:
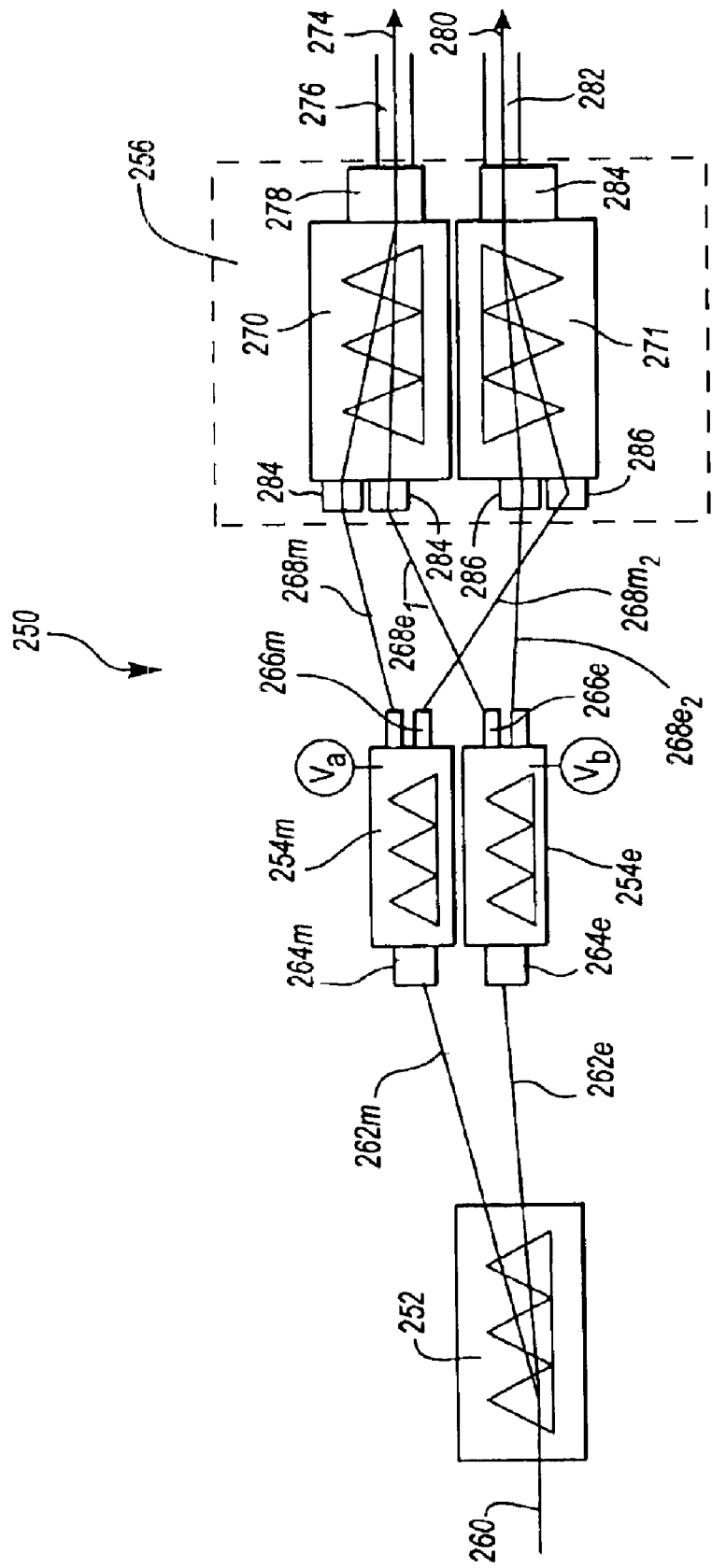
FIG. 9 depicts a 1×2 switch using an lithium niobate-based polarization splitter/combiner of FIG. 3.

FIG. 9 depicts an LNO-based 1×2 switch 250 in accordance with an embodiment of the invention. The LNO-based switch 250 includes an LNO-based splitter 252, LNO-based deflectors 254$m$ and 254$e$, and an LNO-based combining system 256. An input beam 260 having both a TM-component and a TE-component enters the LNO-based splitter 252 and exits the splitter divided into a TM component 262$m$ and a TE component 262$e$. The TM component 262$m$ is aligned and focused into the deflector 254$m$ by a ferrule 264$m$, which includes at least one lens. After being deflected by an angle that is determined by an applied voltage $V_a$, the TM component 262$m$ passes through a ferrule 266$m$ and emerges as either a deflected TM component 268$m_1$ or a deflected TM component 268$m_2$. The deflected TM component 268$m_1$ is fed into a first LNO-based polarization combiner 270, and the deflected TM component 268$m_2$ is fed into a second LNO-based polarization combiner 271.

The TE component 262$e$ enters the deflector 254$e$ through a ferrule 264$e$, which may be similar to the ferrule 264$m$. Through applied voltage $V_b$, the TE component 262$e$ is deflected by a predetermined angle and either feeds into the first LNO-based polarization combiner 270 as a deflected TE component 268$e_1$ or feeds into the second LNO-based polarization combiner 271 as a deflected TE component 268$e_2$. The first LNO-based polarization combiner 270 combines the deflected TE component 268$e_1$ with the deflected TM component 268$m_1$ to form a first output beam 274 propagating in a predetermined direction via an output fiber 276. An output lens 278 (e.g., one lens of a microlens array) coupled to the output surface of the first LNO-based polarization combiner 270 properly couples the output beam 274 into the output fiber 276 with minimum coupling loss. Similarly, the second LNO-based polarization combiner 271 combines the TM-component $268m_2$ with the TE-component $268e_2$. The result of the combination is an output beam 280, which is coupled into an output fiber 282 by a an output lens 284 similar to the output lens 278.

In the LNO-based splitter 252, the TM component in the input beam 260 is deflected at an angle approximately three times as large as the angle at which the TE component is deflected regardless of the voltage that is applied. If a high voltage is applied, θ will be larger than if a low voltage is applied, but the approximately 3:1 ratio in the angles of deflection remains substantially constant. Substantially all of the TM component is deflected by approximately 3θ and substantially all of the TE component is deflected by θ as it passes through the prism array in the LNO-based splitter 252. Thus, the two polarization modes are successfully separated. If only one polarization mode is present in the input beam 260, all of the input beam 260 will be deflected in the same direction.

In this particular embodiment, the first LNO-based polarization combiner 270 and the second LNO-based polarization combiner 271 are configured so that the prism array in one combiner is oriented upside down relative to the prism array in the other combiner. The first LNO-based polarization combiner 270 may be substantially similar to the splitter 252 except that the polarity of the applied voltage is reversed. Thus, the TM component $268m_1$, which was deflected by 3θ in the splitter 252, is deflected by −3θ in the first LNO-based polarization combiner 270. Likewise, the TE component $268e_1$, which was deflected by θ in the splitter 252, is deflected by −θ in the second LNO-based polarization combiner 270. Each of the ferrules 284 includes a lens that orients the deflected light beams $268m_1$ and $268e_1$ so that they enter the first LNO-based polarization combiner 270 at proper angles and become combined upon deflection by −3θ and −θ, respectively. As for the second LNO-based polarization combiner 271, it is the first LNO-based polarization combiner 270 positioned differently (an "upside down" version of the first LNO-based polarization combiner 270 in this figure). The same voltage is applied to the second LNO-based polarization combiner 271 as to the first LNO-based polarization combiner 270. However, because the second LNO-based polarization combiner 271 is positioned upsidedown, what is a downward deflection in an angle of −3θ in the first LNO polarization combiner 270 is an upward deflection in an angle of 3θ in the second LNO polarization combiner 271. Likewise, what is a downward deflection in an angle of −θ in the first LNO polarization combiner 270 is an upward deflection in an angle of θ in the second LNO polarization combiner 271. Thus, the TM component $268m_2$ is deflected upward by 3θ and the TE component $268e_2$ is deflected upward by θ. The respective deflections cause the two beams to combine at the exit surface of the second LNO-based polarization combiner 271 and become coupled into the output fiber 282 by lens array 284.

The second LNO-based polarization combiner 271 does not have to be an upside-down version of the first LNO-based polarization combiner 270, and is shown to be an upside-down version in order to illustrate that beams can be manipulated by changing the positions of the LNO slabs.

Figure 10A:
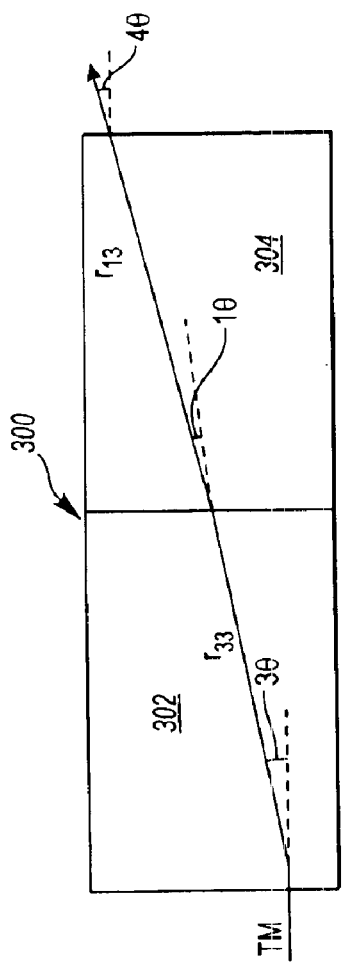
FIG. 10A depicts a propagation path of a TM-polarized light beam in a multi-lithium-niobate-slab arrangement.

FIG. 10A depicts a multi-slab arrangement 300 including a first slab 302 and a second slab 304. The first slab 302 is positioned so that when a TM-polarized input beam 306 enters the first slab 302, it travels along the $r_{33}$ axis and becomes deflected by 3θ. The second slab 304 is positioned so that its crystal axes are rotated by 90° relative to the crystal axes of the first slab 302. Thus, when the TM-polarized input beam 306 propagates into the second slab 304, it propagates along the $r_{13}$ axis instead of the $r_{33}$ axis and becomes deflected by θ. At the entrance surface of the first slab 302, the angle 3θ is measured relative to the direction in which the input beam 306 travels. At the interface of the fist slab 302 and the second slab 304, the deflection angle θ is measured from the direction in which the light beam travels through the first slab 302. Thus, the overall angle of deflection at the exit surface of the second slab 304 is 3θ+θ=4θ.

Figure 10B:
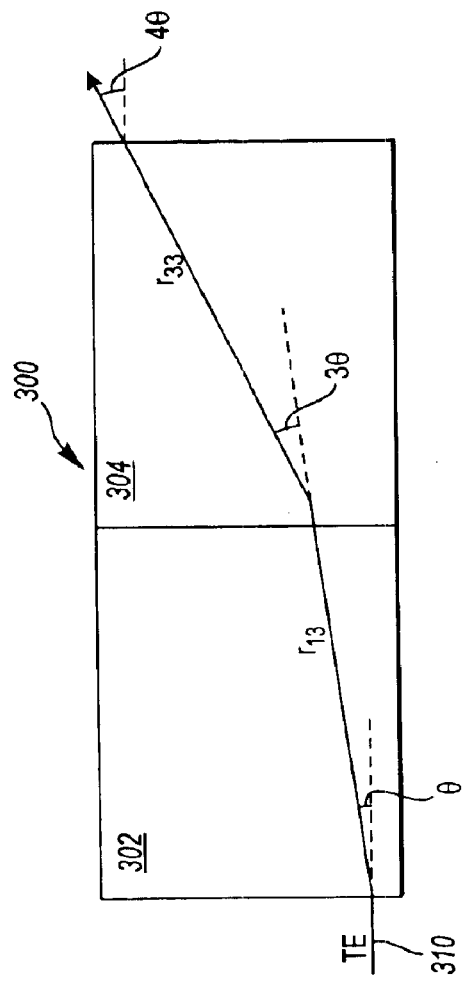
FIG. 10B depicts a propagation path of a TE-polarized light beam in a multi-lithium-niobate-slab arrangement.

FIG. 10B depicts the propagation path of a TE-polarized input beam 310 through the multi-slab arrangement 300 of FIG. 10A. Since TE-polarization and TM-polarization states are orthogonal to each other, the TE-polarized input beam 310 propagates along the r13 axis through the first slab 302, where the TM-polarized input beam 306 (FIG. 10A) propagates along the r33 axis. Then, the TE-polarized input beam 310 propagates through the r33 axis of the second slab 304, where the TM-polarized input beam 306 (FIG. 10A) travels along the r13 axis. The first slab 302 deflects the TE-polarized input beam 310 by an angle of θ measured from the direction in which the TE-polarized input beam 310 travels. The second slab 304 deflects the TE-polarized input beam 310 by an angle of 3θ measured from the direction in which the light beam travels through the first slab 302. Thus, the overall angle of deflection at the exit surface of the second slab 304 is θ+3θ=4θ.

This overall deflection angle of 4θ is achieved by arranging the two LNO slabs so that in the first LNO slab, the crystals are aligned for the TM-polarized input beam 306 to travel along the $r_{33}$ axis and the TE-polarized input beam 310 to travel along the $r_{13}$ axis. In order for the two beams to end up propagating at the same overall deflection angle, the thicknesses of the first LNO slab 302 and the second LNO slab 304 are substantially equal. A person of ordinary skill in the art would understand that in an LNO slab, $r_{13}$ and $r_{33}$ are the two non-zero indices that are accompanied by deflection. A part of the input light beam that experiences an index of refraction $r_{11}$, on the other hand, changes its polarization state but is not deflected.

Figure 11:
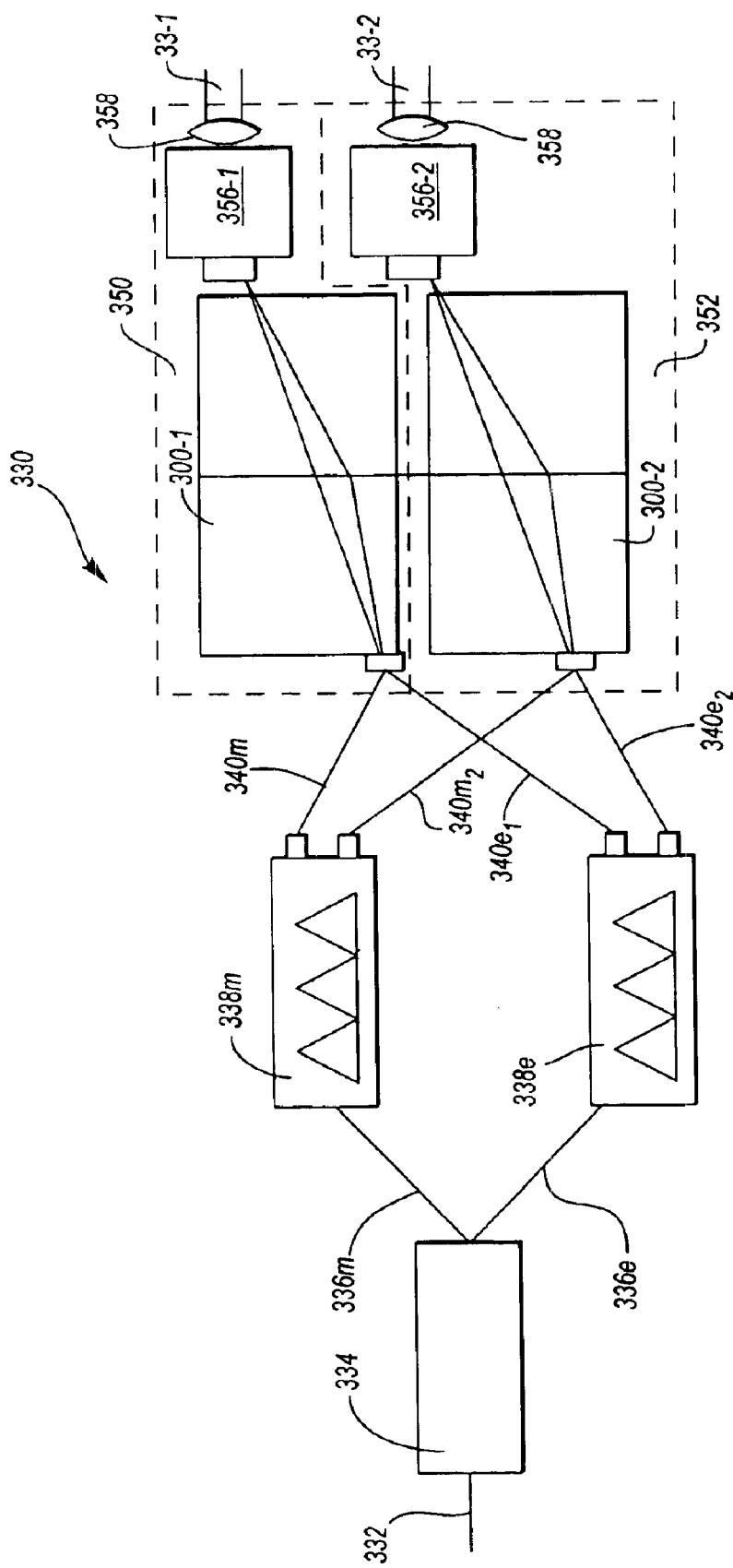
FIG. 11 depicts a 1×2 polarization-independent switching system including the multi-slab arrangement 300 of FIG. 10A and FIG. 10B.

FIG. 11 depicts how the multi-slab arrangement 300 of FIG. 10A and FIG. 10B is used in a 1×2 polarization-independent switching system 330. An input beam 332 having both the TE and the TM polarization states is fed into a polarization splitter 334. The input beam 332 may be, for example, polarized at 45° indicating that there is approximately equal intensity of TE-mode light and TM-mode light in the input beam. Whatever the proportion of the TE-mode and the TM-mode components are, the polarization splitter 334 will divide it into a TM-mode component 336m and a TE-mode component 336e. The polarization splitter 334 may be any of the conventional polarization splitters available in the market or an LNO-based polarization splitter as shown above in FIG. 3. The TM-mode component 336m is deflected by a deflector 338m so that it exits the deflector 338m as either a first deflected TM component $340m_1$ or a second deflected TM component $340m_2$. The TE-mode component 336e is deflected by a deflector 338e, exits the deflector 338e as either a first deflected TE component $340e_1$ or a second deflected TE component $340e_2$. The components $340m_1$ and $340e_1$ are coupled into a combining system 350, and the components $340m_2$ and $340e_2$ are coupled into a combining system 352. The combining systems 350 and 352 each includes a dual-slab arrangement 300 shown in FIGS. 10A and 10B, a beam combiner 356, and a lens 358 coupled to an output fiber 33. Both components $340m_1$ and $340e_1$ exit the dual slab arrangements 300 with an overall deflection of 4θ. However, at this point, the components are not combined into one unpolarized beam—they are simply two linearly polarized beams propagating together. The linearly polarized beams $340m_1$ and $340e_1$ are fed into beam combiners 356-1 and 356-2, respectively, to become merged into an unpolarized output beam. The unpolarized output beam is then coupled to output fiber 33 by lens 358.

Figure 12:
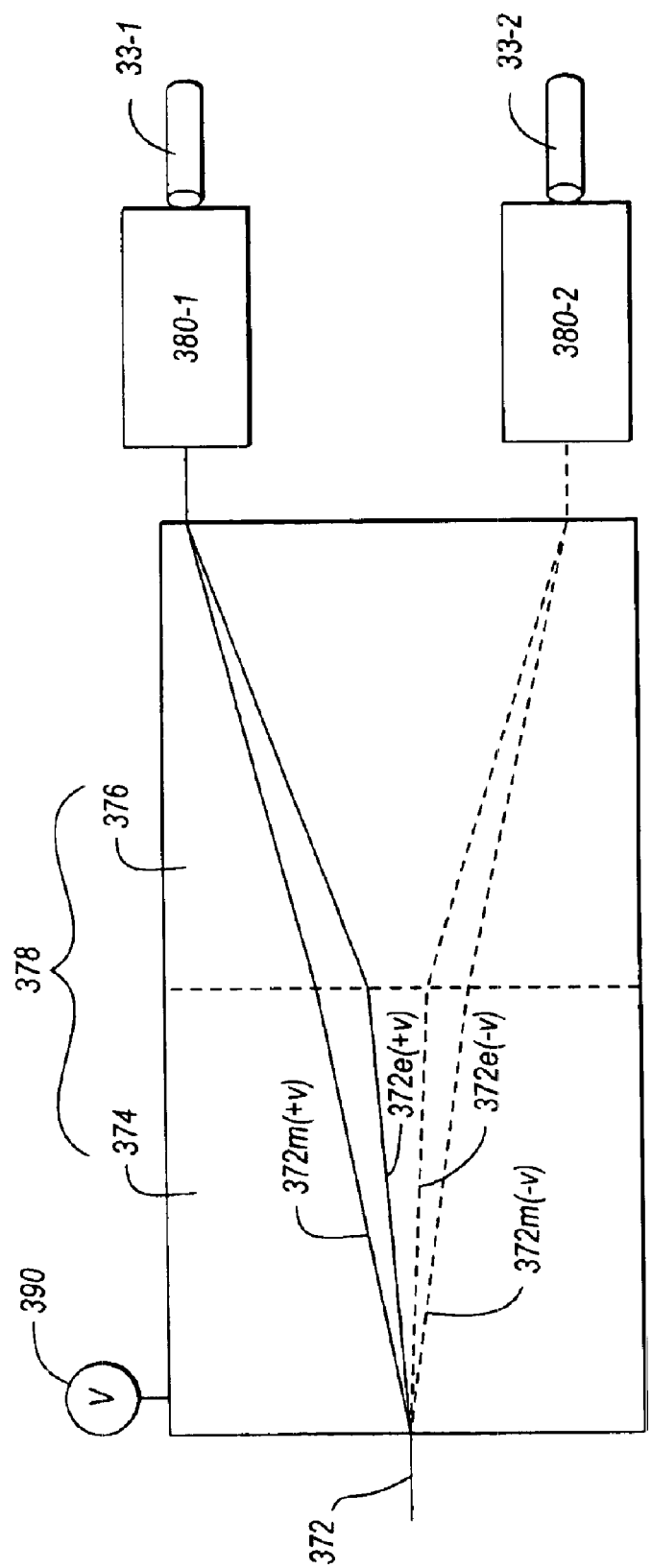
FIG. 12 depicts an alternative 1×2 multi-slab polarization-independent switching system including the multi-slab arrangement 300 of FIG. 10A and FIG. 10B.

FIG. 12 depicts an alternative manner in which the multi-slab arrangement 300 of FIG. 10A and FIG. 10B is used in a 1×2 polarization-independent switching system 370. An unpolarized input beam 372 having both the TE and the TM polarization states is fed into a multi-slab polarization splitter 378. The multi-slab polarization splitter 378 is similar to the multi-slab arrangement 300 (FIG. 10A, FIG. 10B), and includes a first slab 374 and a second slab 376 positioned so that a light beam having a certain polarization state travels along different optical axes in each slab. For example, the TM-polarized component 372m propagates along the $r_{33}$ axis in the first slab 374 and along the $r_{13}$ axis in the second slab 376. As a result, the TM-polarized component 372m is deflected by 3θ in the first slab 374 and by θ in the second slab 376. The TE-polarized component 372e, on the other hand, is deflected by θ in the first slab 374 and by 3θ in the second slab 376. The overall result is that the input beam 372 is split into a TM- and a TE- component, and each component is deflected toward one of polarization combiners 380-1 and 380-2 and eventually coupled into an output fiber 33-i.

The switching direction is controlled by an applied voltage 390. In FIG. 12, the direction of deflection when a positive voltage V is applied is shown by solid lines, and the direction of deflection when a negative voltage −V is applied is shown by broken lines. The TM-polarized component 372m is deflected by 3θ and θ when a positive voltage V is applied, and by −3θ and θ when a negative voltage −V is applied. The TE-polarized component 372e is deflected by θ and 3θ when a positive voltage V is applied, and by −θ and −3θ when a negative voltage −V is applied. This way, applying a positive voltage V results in the input beam 372 being guided into output fiber 33-1 while applying a negative voltage −V results in the input beam 372 being guided into output fiber 33-2.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. An optical switch comprising:
   a polarization splitter that divides an input beam into a first polarized component and a second polarized component, the polarization splitter including a material that changes its refractive index in response to voltage;
   a first polarization-sensitive deflector positioned to receive the first polarized component from the polarization splitter and deflect the first polarized component by a first predetermined angle;
   a second polarization-sensitive deflector positioned to receive the second polarized component from the polarization splitter and deflect the second polarized component by a second predetermined angle; and
   a plurality of polarization combining systems, wherein one of the plurality of polarization combining systems is positioned to receive a deflected first component from the first deflector and a deflected second component from the second deflector to combine the first and the second deflected components into an output beam propagating through an output fiber, each of the polarization combining systems comprising:
      an input lens that receives the first and the second polarized components and directs the received components to a poled material, wherein the input lens is designed and located to focus on a plane farther away from the input lens than a light exiting surface of the poled material;
      said poled material, which changes its refractive index in response to voltage and directs the first deflected component and the second deflected component to a common area to be combined;
      a polarization combiner that combines the first deflected component and the second deflected component to generate an output beam; and
      an output lens optically coupled to the polarization combiner, the output lens focusing the output beam into the output fiber.

2. The optical switch of claim 1, wherein the input lens and the output lens are gradient index lenses.

3. An optical switch comprising:
   a polarization splitter that divides an input beam into a first polarized component and a second polarized component, the polarization splitter including a material that changes its refractive index in response to voltage;
   a first polarization-sensitive deflector positioned to receive the first polarized component from the polarization splitter and deflect the first polarized component by a first predetermined angle;
   a second polarization-sensitive deflector positioned to receive the second polarized component from the polarization splitter and deflect the second polarized component by a second predetermined angle; and
   a plurality of polarization combining systems, wherein one of the plurality of polarization combining systems is positioned to receive a deflected first component from the first deflector and a deflected second component from the second deflector to combine the first and the second deflected components into an output beam propagating through an output fiber, each of the polarization combining systems comprising:
      an input lens that receives the first and the second polarized components and directs the received components to a poled material, wherein the input lens is designed and located to focus on a plane near a center of the poled material;
      said poled material, which changes its refractive index in response to voltage and directs the first deflected component and the second deflected component to a common area to be combined;
      a polarization combiner that combines the first deflected component and the second deflected component to generate an output beam; and
      an output lens optically coupled to the polarization combiner, the output lens focusing the output beam into the output fiber.

4. An optical switch comprising:
   a polarization splitter that divides an input beam into a first polarized component and a second polarized component, the polarization splitter including a material that changes its refractive index in response to voltage;
   a first polarization-sensitive deflector positioned to receive the first polarized component from the polarization splitter and deflect the first polarized component by a first predetermined angle;
   a second polarization-sensitive deflector positioned to receive the second polarized component from the polarization splitter and deflect the second polarized component by a second predetermined angle; and
   a plurality of polarization combining systems, wherein one of the plurality of polarization combining systems is positioned to receive a deflected first component from the first deflector and a deflected second component from the second deflector to combine the first and the second deflected components into an output beam propagating through an output fiber, wherein at least one of the polarization combiners comprises:
- a first lithium niobate slab positioned so that a first polarized component travels along an $r_{33}$ axis and a second polarized component travels along an $r_{13}$ axis; and
- a second lithium niobate slab optically coupled to the first lithium niobate slab, the second lithium niobate slab positioned so that the first polarized component travels along the $r_{13}$ axis and the second polarized component travels along the $r_{33}$ axis, the first lithium niobate slab and the second lithium niobate slab being positioned relative to each other so that the first polarized component and the second polarized component propagate in a substantially same direction after passing through both slabs.

5. The optical switch of claim 4 wherein the first lithium niobate slab and the second lithium niobate slab are adjacent to each other and substantially the same thickness in a main direction in which the first polarized component and the second polarized components propagate.

6. An optical switch comprising:
- a polarization splitter that divides an input beam into a first polarized component and a second polarized component, the polarization splitter including a material that changes its refractive index in response to voltage;
- a first polarization-sensitive deflector positioned to receive the first polarized component from the polarization splitter and deflect the first polarized component by a first predetermined angle;
- a second polarization-sensitive deflector positioned to receive the second polarized component from the polarization splitter and deflect the second polarized component by a second predetermined angle; and
- a plurality of polarization combining systems, wherein one of the plurality of polarization combining systems is positioned to receive a deflected first component from the first deflector and a deflected second component from the second deflector to combine the first and the second deflected components into an output beam propagating through an output fiber, wherein at least one of the polarization combiners comprises:
  - a first lithium tantalate slab positioned so that a first polarized component travels along an $r_{33}$ axis and a second polarized component travels along an $r_{13}$ axis; and
  - a second lithium tantalate slab optically coupled to the first lithium tantalate slab, the second lithium tantalate slab positioned so that the first polarized component travels along the $r_{13}$ axis and the second polarized component travels along the $r_{33}$ axis, the first lithium tantalate slab and the second lithium tantalate slab being positioned relative to each other so that the first polarized component and the second polarized component propagate in a substantially same direction after passing through both slabs.

7. A method of switching a light beam, the method comprising:
- dividing an input beam into a first polarized component and a second polarized component by passing the input beam through a poled region in a lithium niobate slab, wherein dividing the input beam includes:
  - deflecting the first polarized component by a first angle $\theta_1$; and
  - deflecting the second polarized component by a second angle $\theta_2$ different from the first angle;
- deflecting the first polarized component toward one of a set of polarization combiners;
- deflecting the second polarized component into one of a set of polarization combiners; and
- combining the first polarized component and the second polarized component if they are directed to the same polarization combiner, wherein combining includes:
  - passing the first polarized component and the second polarized component through a second poled region in a second lithium niobate slab wherein the second poled region is substantially similar to the first poled region; and
  - applying to the second poled region a voltage that is of opposite polarity to a voltage applied to the first poled region to deflect the first polarized component by $-\theta_1$ and the second polarized component by $-\theta_2$.

8. A method of switching a light beam, the method comprising:
- dividing an input beam into a first polarized component and a second polarized component by passing the input beam through a poled region in a lithium tantalate slab, wherein dividing the input beam includes:
  - deflecting the first polarized component by a first angle $\theta_1$; and
  - deflecting the second polarized component by a second angle $\theta_2$ different from the first angle;
- deflecting the first polarized component toward one of a set of polarization combiners;
- deflecting the second polarized component into one of a set of polarization combiners; and
- combining the first polarized component and the second polarized component if they are directed to the same polarization combiner wherein combining includes:
  - passing the first polarized component and the second polarized component through a second poled region in a second lithium tantalate slab wherein the second poled region is substantially similar to the first poled region; and
  - applying to the second poled region a voltage that is of opposite polarity to a voltage applied to the first poled region to deflect the first polarized component by $-\theta_1$ and the second polarized component by $-\theta_2$.

9. A method of switching a light beam, the method comprising:
- dividing an input beam into a first polarized component and a second polarized component by passing the input beam through a poled region in a lithium tantalate slab, wherein dividing the input beam includes:
  - deflecting the first polarized component by a first angle $\theta_1$; and
  - deflecting the second polarized component by a second angle $\theta_2$ different from the first angle;
- deflecting the first polarized component toward one of a set of polarization combiners;
- deflecting the second polarized component into one of a set of polarization combiners; and
- combining the first polarized component and the second polarized component if they are directed to the same polarization combiner, wherein combining includes:
  - passing the first polarized component and the second polarized component through a second poled region in a second lithium tantalate slab wherein the second poled region is designed to deflect the first polarized component by $-\theta_1$ and the second polarized component by $-\theta_2$ so that the first polarized component and the second polarized component are propagating in a substantially same direction after the combining.

* * * * *

UNITED STATES PATENT AND TRADEMARK OFFICE
CERTIFICATE OF CORRECTION

| | | |
|---|---|---|
| PATENT NO. | : 6,915,031 B2 | Page 1 of 3 |
| APPLICATION NO. | : 10/278568 | |
| DATED | : July 5, 2005 | |
| INVENTOR(S) | : Maki et al. | |

It is certified that error appears in the above-identified patent and that said Letters Patent is hereby corrected as shown below:

Cover Page,
Item (56), under "OTHER PUBLICATIONS", after "Domain" change "Reveral" to --Reversal--

Drawings,
Sheet 3, Figure 3, change reference "70c" to --70e--
Sheet 7, Figure 9, change reference number "268m" to --268m$_1$--
Sheet 8, Figure 10A, please replace figure as shown below to add missing reference number "306" to the drawing:

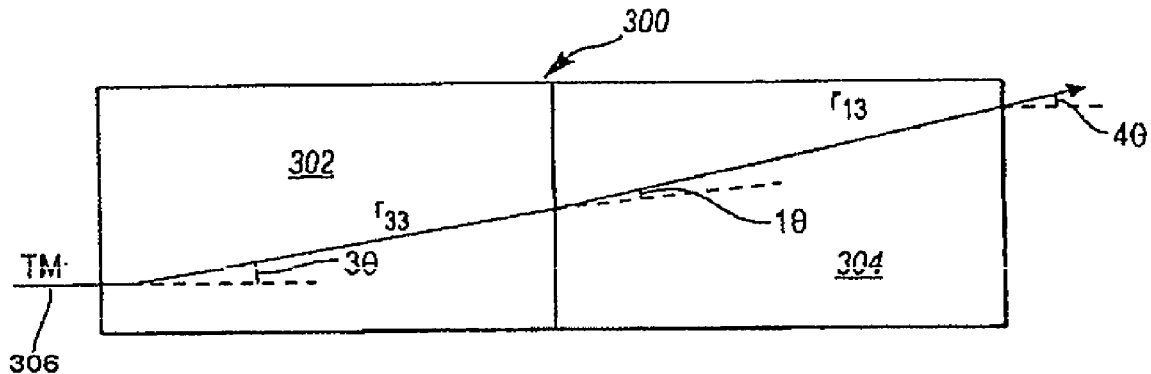

Fig. 10A

Sheet 9, Figure 11, change reference number "340m" to --340m$_1$--

UNITED STATES PATENT AND TRADEMARK OFFICE
CERTIFICATE OF CORRECTION

PATENT NO. : 6,915,031 B2
APPLICATION NO. : 10/278568
DATED : July 5, 2005
INVENTOR(S) : Maki et al.

Page 2 of 3

It is certified that error appears in the above-identified patent and that said Letters Patent is hereby corrected as shown below:

Drawings,
Sheet 10, Figure 12, replace figure as shown below to add missing reference number "370" to drawings:

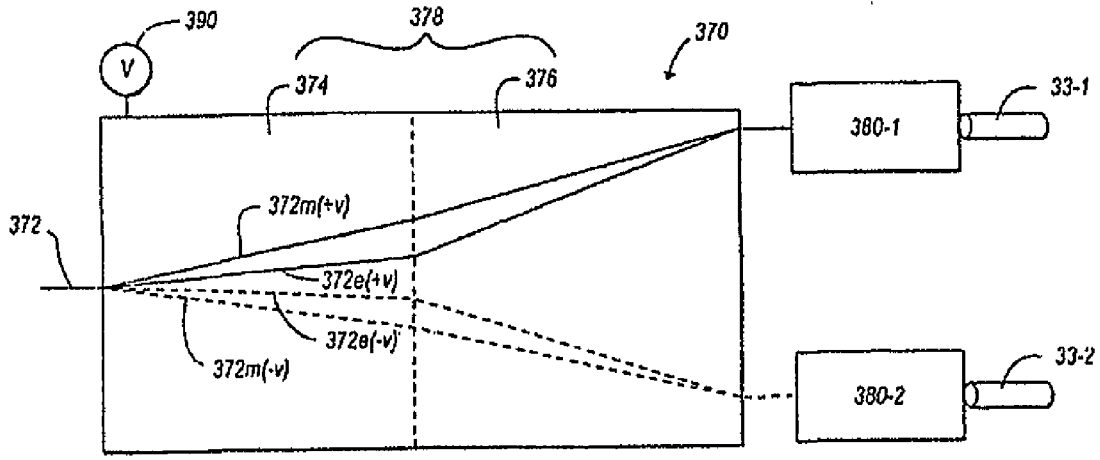

Fig. 12

Column 3,
Line 29, after "attenuators" change "34." to --50.--
Line 30, after "attenuators" change "34" to --50--
Line 31, after "attenuators" change "34" to --50--
Line 34, after "attenuators" change "34" to --50--
Line 38, after "attenuators" change "34" to --50--

Column 4,
Line 43, after "prism array" change "16" to --66--
Line 55, change "n=index" to --$n_o$=index--
Line 67, change "10/278.209." to --10/278,209.--

UNITED STATES PATENT AND TRADEMARK OFFICE
CERTIFICATE OF CORRECTION

PATENT NO. : 6,915,031 B2
APPLICATION NO. : 10/278568
DATED : July 5, 2005
INVENTOR(S) : Maki et al.

It is certified that error appears in the above-identified patent and that said Letters Patent is hereby corrected as shown below:

Column 5,
Line 24, after "light beam" change "170" to --70--
Line 27, after "beam" change "170" to --70--

Column 7,
Line 7, change "larges" to --large--
Line 14, change "$\varphi_{2.v}$" to -- -$\varphi_{2.v}$ --
Line 48, after "input lens" remove [lenses]

Column 8,
Line 14, before "light beam" insert --the--
Line 46, after "light beam" remove [118]
Line 67, after "deflected TE" change "component" to --components--

Column 9,
Line 8, after "the same" remove [as the]
Line 21, after "through" change "208$m_1$." to --208$m_n$.--
Line 25, after "deflected beam" change "208$e_2$" to --208$m_2$--
Line 29, change "exit" to --exits--

Column 12,
Line 55, after "deflector 338e," insert --then--

Column 13,
Line 1, change "combiners 356-1 and 356-2, respectively," to --combiner 356-1--

Signed and Sealed this

First Day of January, 2008

JON W. DUDAS
*Director of the United States Patent and Trademark Office*